Figure 1A:
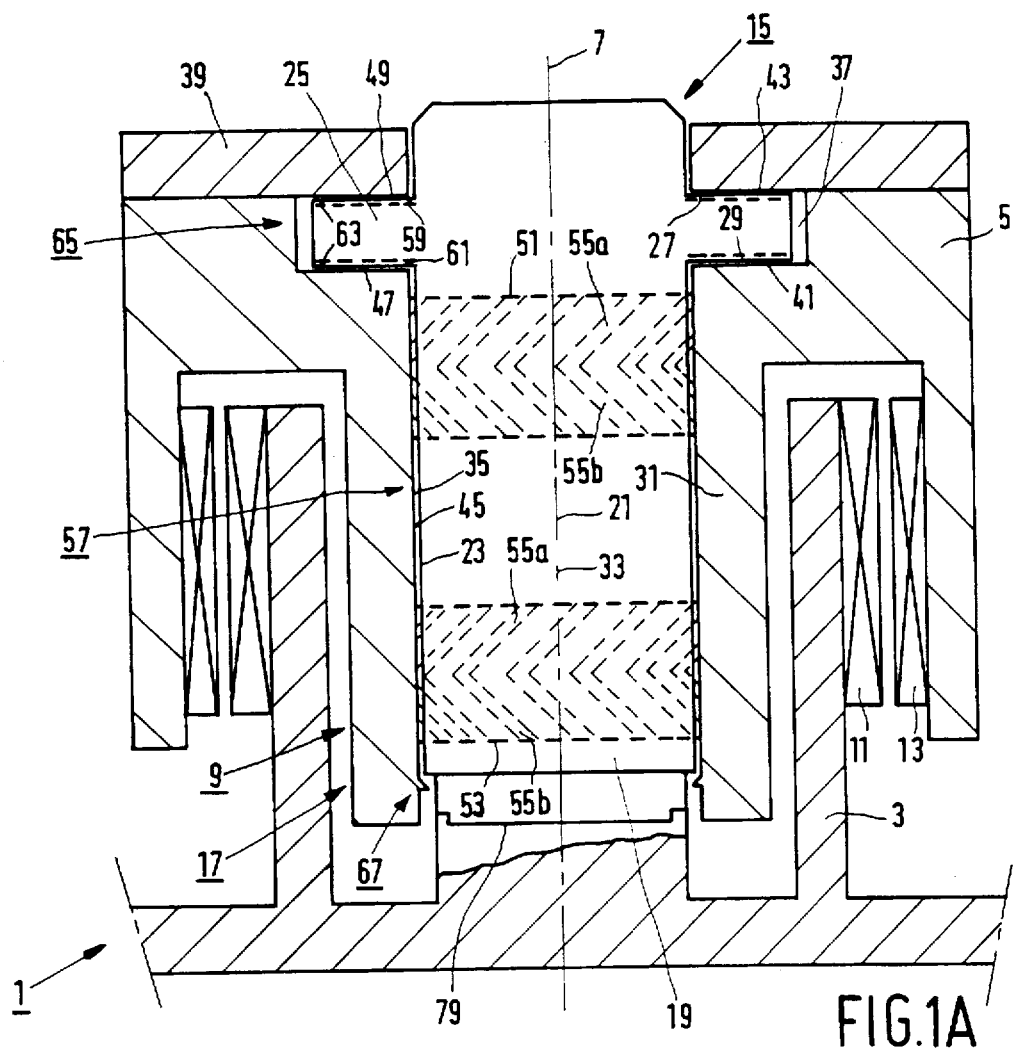

United States Patent [19]
Thijsse et al.

[11] Patent Number: 5,722,775
[45] Date of Patent: Mar. 3, 1998

[54] DYNAMIC GROOVE BEARING WITH A LUBRICANT BARRIER

[75] Inventors: Carel J. Thijsse; Leonardus P.M. Tielemans; Jelm Franse, all of Eindhoven; Ronny Verzijl, Rotterdam; Robert C.H. Boereboom, Eindhoven, all of Netherlands

[73] Assignee: U.S. Philips Corporation, New York, N.Y.

[21] Appl. No.: 762,892

[22] Filed: Dec. 10, 1996

[30]  Foreign Application Priority Data

Dec. 22, 1995 [EP] European Pat. Off. .............. 95203610

[51] Int. Cl.$^6$ ...................................................... F16C 32/06
[52] U.S. Cl. ............................................ 384/119; 384/132
[58] Field of Search .................................... 384/100, 107, 384/114, 119, 120, 132, 133

[56]  References Cited

U.S. PATENT DOCUMENTS

| | | | |
|---|---|---|---|
| 5,246,294 | 9/1993 | Pan ........................................ | 384/119 |
| 5,427,456 | 6/1995 | Henzel ................................... | 384/112 |
| 5,558,443 | 9/1996 | Zang ...................................... | 384/119 X |
| 5,558,445 | 9/1996 | Chen et al. ............................. | 384/132 |

FOREIGN PATENT DOCUMENTS 6-178492 A   6/1994  Japan.

*Primary Examiner*—Thomas R. Hannon
*Attorney, Agent, or Firm*—Robert M. McDermott

[57]  ABSTRACT

A dynamic groove bearing (9, 83, 95) with an inner bearing pan (15) and an outer bearing part (17) which is rotatable about the inner bearing part (15). The bearing parts (15, 17) are provided with cooperating bearing surfaces (23, 35) between which a bearing gap (45) is present filled with a liquid lubricant (75). The bearing surface (35) of at least one of the bearing pans (17) is provided with a pattern of grooves (51, 53).

The outer bearing part (17) has an annular barrier (69, 87, 99) which is raised with respect to the bearing surface (35) of the outer bearing part (17) and which bounds the bearing gap (45). The barrier (69, 87, 99) prevents leakage of the liquid lubricant (75) from the dynamic groove bearing (9, 83, 95) at comparatively high rotation speeds of the dynamic groove bearing (9, 83, 95).

The dynamic groove bearing (9, 83, 95) can be used in an electric motor (1, 81, 93) of a data storage unit (113) in which an information disc (115), for example a hard disk of a computer, can be rotated relative to a scanning unit (121) with a magnetic head (123) by the electric motor (1, 81, 93).

15 Claims, 4 Drawing Sheets

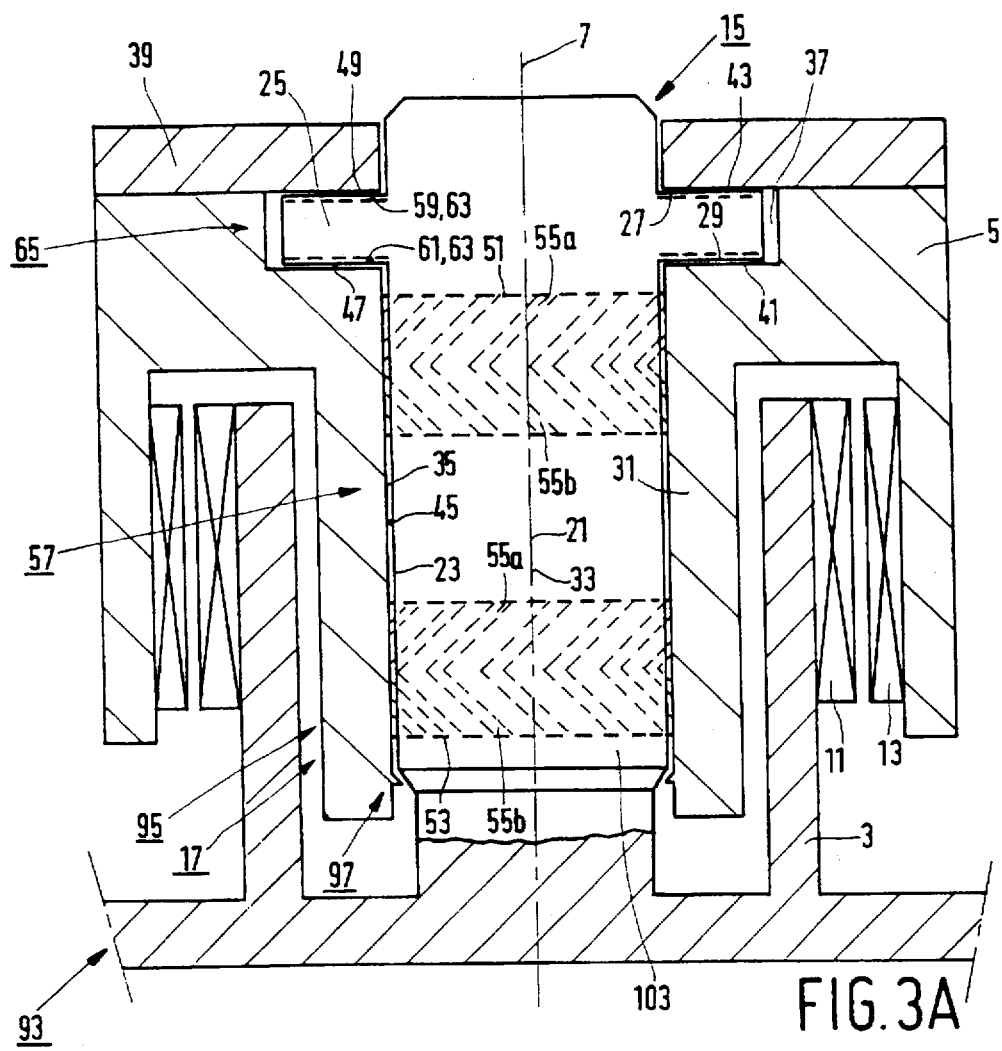
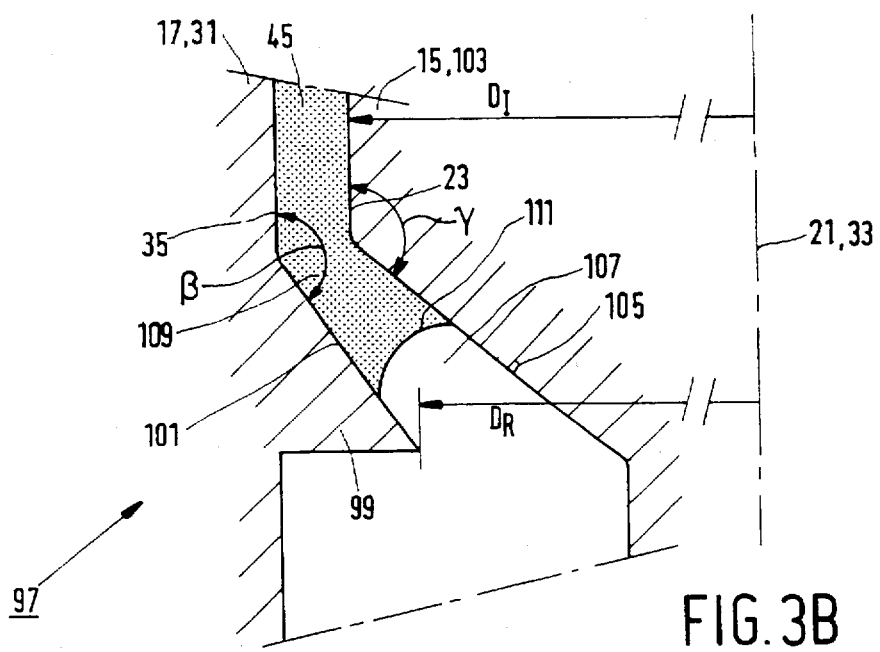

DYNAMIC GROOVE BEARING WITH A LUBRICANT BARRIER

The invention relates to a dynamic groove bearing with an inner bearing part and an outer bearing part which is rotatable about the inner bearing part, which bearing parts are provided with cooperating bearing surfaces between which there is a bearing gap in which a liquid lubricant is present during operation, while the bearing surface of at least one of the bearing pans is provided with a pattern of grooves and the dynamic groove bearing comprises means for preventing leakage of liquid lubricant from the bearing gap.

The invention also relates to an outer bearing part suitable for use in a dynamic groove bearing according to the invention.

The invention also relates to an inner bearing part suitable for use in a dynamic groove bearing according to the invention.

The invention further relates to an electric motor with a stator and a rotor which is journaled With rotation possibility relative to the stator by means of a dynamic groove bearing, the stator being fastened to an inner bearing part of the dynamic groove bearing and the rotor to an outer bearing part of the dynamic groove bearing.

The invention also relates to a data storage unit with an information disc and a scanning unit for cooperating with the information disc, said disc being rotatable in a housing by means of an electric motor.

A dynamic groove bearing and an electric motor of the kind mentioned in the opening paragraphs are known from JP-A-6-178492. The inner bearing part of the known dynamic groove bearing comprises a fixedly arranged shaft which is provided with a circular-cylindrical bearing surface on which the pattern of grooves is provided. The outer bearing part of the known dynamic groove bearing comprises a bush which is rotatable about the axis and is provided with a smooth circular-cylindrical bearing surface which is to cooperate with the bearing surface of the shaft. A familiar problem in such a dynamic groove bearing is that leakage of liquid lubricant from the bearing gap takes place above a critical speed of the dynamic groove bearing. In the known dynamic groove bearing, an annular recess is provided in the bearing surface of the bush, which recess bounds the bearing gap between the cooperating bearing surfaces of the shaft and the bush. The liquid lubricant leaking from the bearing gap is caught in the annular recess during operation. The liquid lubricant leaked from the bearing gap is held in the annular recess under the influence of a centrifugal force acting on the liquid lubricant as a result of the rotation of the bush around the shaft. Leakage of liquid lubricant from the known dynamic groove bearing is prevented as much as possible in this manner during operation.

A disadvantage of the known dynamic groove bearing is that said angular recess does not prevent leakage of liquid lubricant from the dynamic groove bearing at comparatively high speeds of the bush around the shaft. At such comparatively high speeds of the bush around the shaft, which occur, for example, when the dynamic groove bearing is used in an electric motor for driving a computer hard disk, a comparatively major leakage of liquid lubricant from the bearing gap occurs. As a result, the recess mentioned above becomes entirely filled with liquid lubricant which then spills over the edge of the recess and thus leaks from the dynamic groove bearing.

It is an object of the invention to provide a dynamic groove bearing of the kind mentioned in the opening paragraph in which leakage of liquid lubricant from the dynamic groove bearing is prevented also at comparatively high speeds of the outer bearing part revolving about the inner bearing part.

The invention is for this purpose characterized in that said means comprise an annular barrier which is raised relative to the bearing surface of the outer bearing part and which bounds the bearing gap. The liquid lubricant leaking from the bearing gap present between the cooperating bearing surfaces during operation forms a layer which covers the bearing surface of the outer bearing part adjacent the raised annular barrier under the influence of the centrifugal force acting on the liquid lubricant. Said layer has a thickness which is dependent on a quantity of liquid lubricant which has leaked from the bearing gap. The layer of liquid lubricant lies in the form of a meniscus against the annular barrier which is raised relative to the bearing surface of the outer bearing part. The meniscus has a level above the bearing surface of the outer bearing part which depends on the quantity of liquid lubricant, a composition of the liquid lubricant, a composition of a material from which the bearing surface and the annular barrier were manufactured or a composition of a coating with which the barrier is coated, and the speed of the outer bearing part, said level increasing with an increase in said speed. When the annular barrier is given a suitable level above the bearing surface of the outer bearing part, it is achieved that said meniscus of the liquid lubricant will not flow over the annular barrier at comparatively high speeds of the outer bearing part, given a previously defined quantity of liquid lubricant, so that leakage of the liquid lubricant from the dynamic groove bearing is prevented at said comparatively high speeds.

A special embodiment of a dynamic groove bearing according to the invention is characterized in that the annular barrier has an internal diameter which is smaller than a diameter of the bearing surface of the inner bearing part adjacent the annular barrier. When the annular barrier is given said internal diameter, it is achieved that a quantity of liquid lubricant can be used without leakage in the dynamic groove bearing which fills the bearing gap substantially entirely up to the raised annular barrier. A satisfactory distribution of the liquid lubricant in the dynamic groove bearing at each and every speed to be used and a satisfactory operation of the dynamic groove bearing are provided thereby.

A further embodiment of a dynamic groove bearing according to the invention is characterized in that the annular barrier has an internal diameter which is greater than a diameter of the bearing surface of the inner bearing part adjacent the annular barrier and smaller than a diameter of the bearing surface of the outer bearing part adjacent the annular barrier. The application of the inner bearing part in the outer bearing part during the manufacture of the dynamic groove bearing is simplified in that the annular barrier is provided with said internal diameter. The use of a quantity of liquid lubricant which fills the bearing gap adjacent the raised annular barrier only partly prevents leakage of the liquid lubricant from the dynamic groove bearing in this further embodiment of the dynamic groove bearing according to the invention.

A yet further embodiment of a dynamic groove bearing according to the invention is characterized in that the annular barrier has a lateral surface facing the bearing gap which is oblique relative to the bearing surface of the outer bearing part. The use of said lateral surface reduces the level of the meniscus with which the liquid lubricant lies against the annular barrier. The meniscus of the liquid lubricant lies against the lateral surface of the annular barrier at a so-called contact angle which depends on the composition of the liquid lubricant, the composition of the material from which the annular barrier was manufactured or the composition of the coating with which the annular barrier is coated, and the speed of the outer bearing part. In proportion as the contact angle between the meniscus and said lateral surface decreases, the level of the meniscus above the bearing surface of the outer bearing part increases. Since said lateral surface is oblique relative to the bearing surface of the outer bearing part, the meniscus has a reduced curvature, so that said level of the meniscus is also reduced. The height required for the annular barrier is limited in this manner.

A particular embodiment of a dynamic groove bearing according to the invention is characterized in that the inner bearing part has a conical surface positioned opposite the lateral surface of the annular barrier, an annular chamber being present between the lateral surface of the annular barrier and the conical surface, which chamber widens in a direction away from the bearing gap. When the dynamic groove bearing is stationary, part of the liquid lubricant will flow from the bearing gap. This liquid lubricant will form a meniscus between the lateral surface of the annular barrier and said conical surface of the inner bearing part in said annular chamber, this liquid lubricant being subject to a capillary force directed towards the bearing gap as a result of the widening shape of the annular chamber. This capillary force prevents a leakage of liquid lubricant from the dynamic groove bearing also when this dynamic groove bearing is stationary.

A further embodiment of a dynamic groove bearing according to the invention is characterized in that the conical surface extends in a direction away from the bearing gap to beyond the lateral surface of the annular barrier. In this further embodiment, the widening annular chamber is comparatively large, so that a comparatively large quantity of liquid lubricant is held in the annular chamber under the influence of the capillary force while the dynamic groove bearing is stationary.

According to the invention, an electric motor of the kind mentioned in the opening section is characterized in that the dynamic groove bearing used therein is a dynamic groove bearing according to the invention. The favourable properties of the dynamic groove bearing according to the invention as described above are used to particular advantage in the electric motor because pollution of the electric motor through leakage of liquid lubricant from the dynamic groove bearing at comparatively high speeds of the electric motor is prevented.

According to the invention, a data storage unit of the kind mentioned in the opening section is characterized in that the electric motor used therein is an electric motor according to the invention. The favourable properties of the electric motor according to the invention and of the dynamic groove bearing used therein as described above are used to particular advantage in the data storage unit because pollution of the data storage unit and of the information disc used therein caused by leakage of liquid lubricant from the dynamic groove bearing of the electric motor at comparatively high speeds of the electric motor is prevented.

Figure 1B:
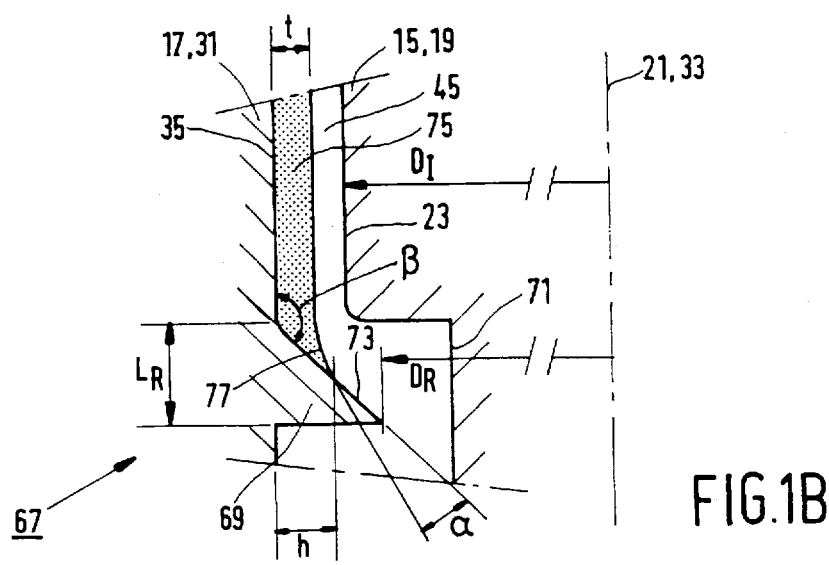
Figure 2A:
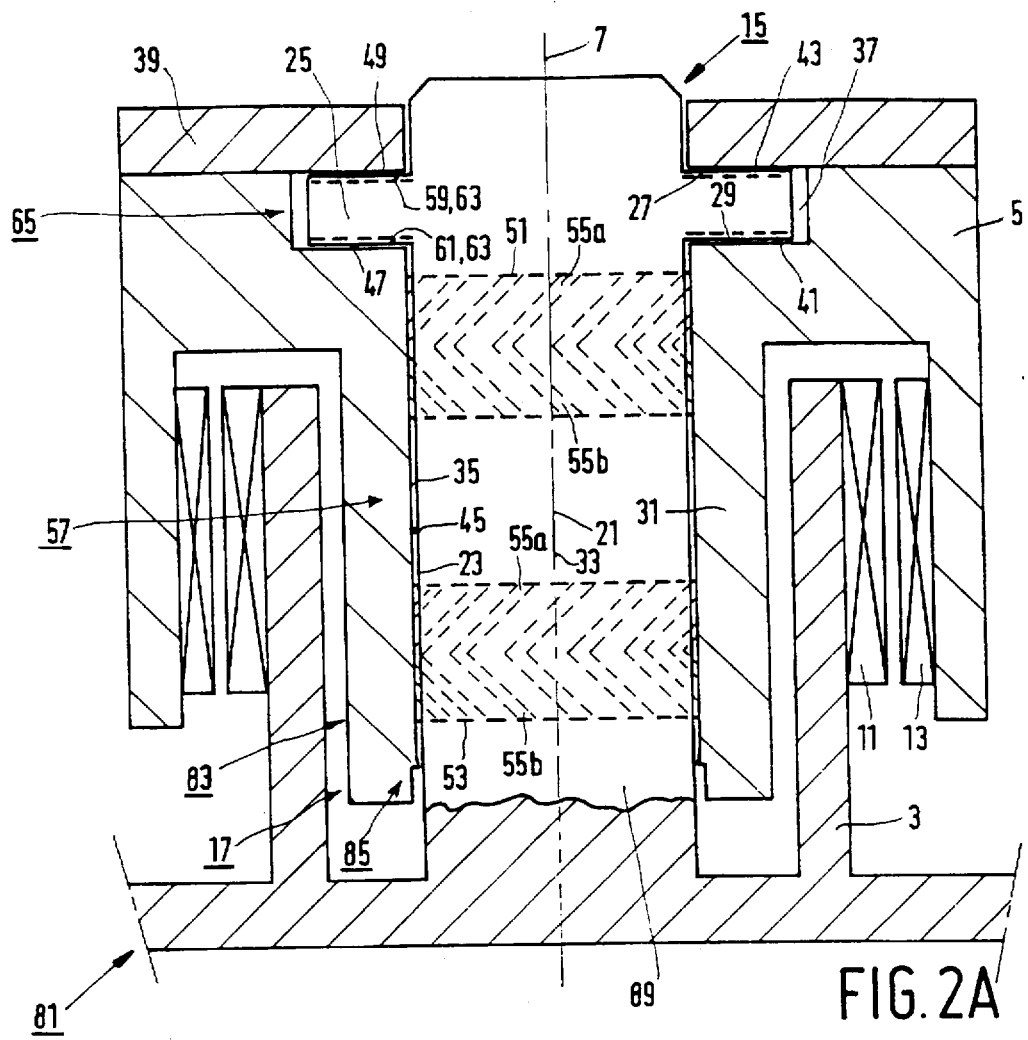
Figure 2B:
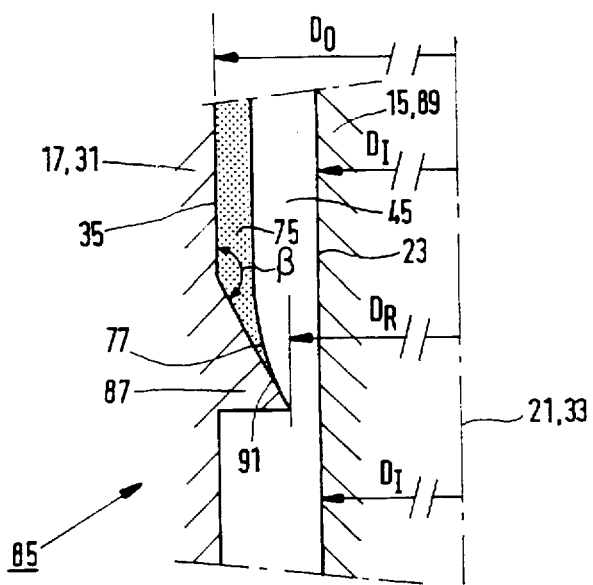
Figure 4:
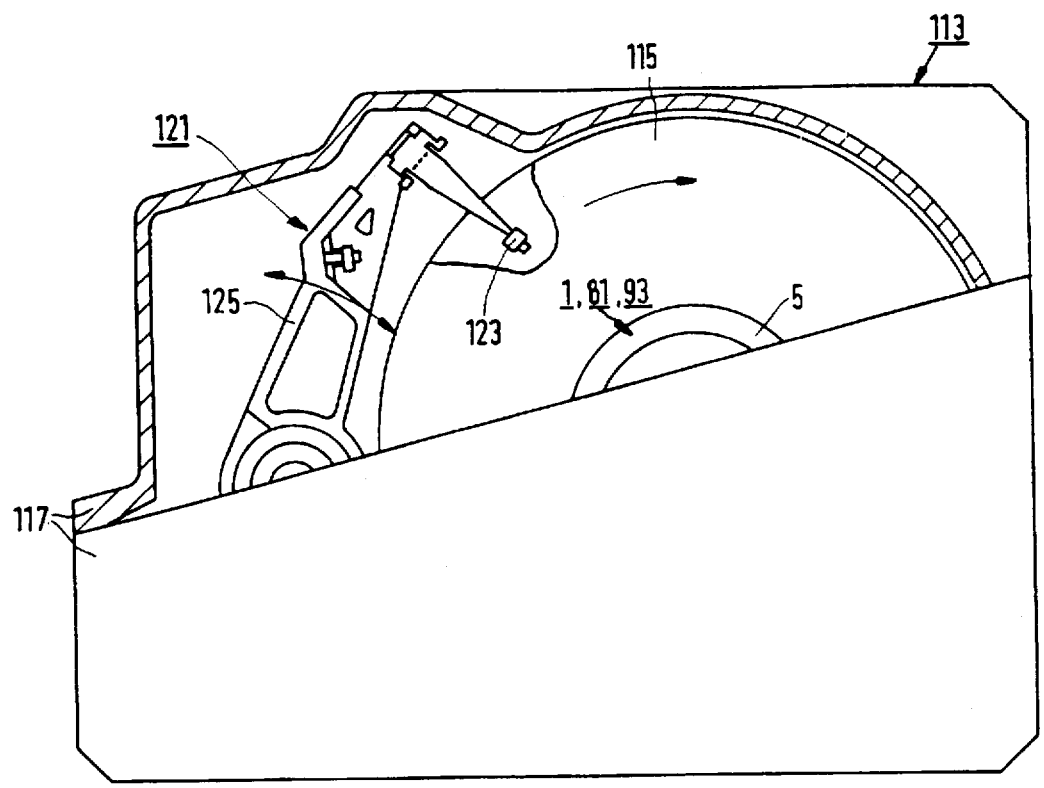
Figure 5:
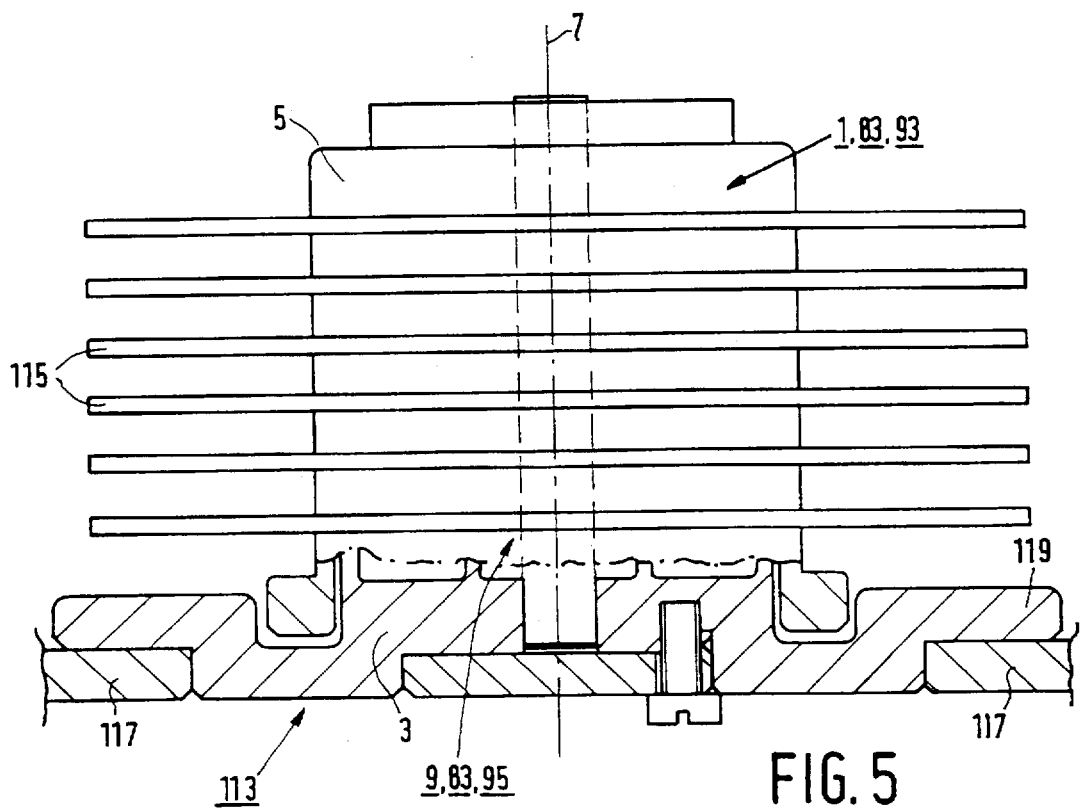

The invention will be explained in more detail below with reference to the drawing, in which FIG. 1a shows an electric motor according to the invention provided with a first embodiment of a dynamic groove bearing according to the invention, FIG. 1b shows in detail an annular barrier of the dynamic groove bearing of FIG. 1a while the motor is routing, FIG. 2a shows an electric motor according to the invention provided with a second embodiment of a dynamic groove bearing according to the invention, FIG. 2b shows in detail an annular barrier of the dynamic groove bearing of FIG. 2a while the motor is rotated, FIG. 3a shows an electric motor according to the invention provided with a third embodiment of a dynamic groove bearing according to the invention, FIG. 3b shows in detail an annular barrier of the dynamic groove bearing of FIG. 3a while the motor is stationary, FIG. 4 is a diagrammatic plan view of a data storage unit with an electric motor and a dynamic groove bearing according to the invention, and FIG. 5 is a side elevation of the dam storage unit of FIG. 4.

In FIGS. 1a, 2a, and 3a, corresponding parts of the electric motors shown in these Figures and of the respective first, second, and third embodiments of the dynamic groove bearing according to the invention used therein have been given the same reference numerals.

The electric motor 1 shown in FIG. 1a comprises a stator 3 and a rotor 5 which is journaled with rotation possibility about an axis of rotation 7 relative to the stator 3 by means of a first embodiment of a dynamic groove bearing 9 according to the invention. The stator 3 comprises an electric coil 11 which is depicted diagrammatically only in FIG. 1a, while the rotor 5 comprises a magnet 13 which is to cooperate with the electric coil 11 and which is depicted diagrammatically only in FIG. 1a.

As FIG. 1a further shows, the dynamic groove bearing 9 has an inner bearing part 15 and an outer bearing part 17 which is rotatable about the axis of rotation 7 relative to the inner bearing part 15. The inner bearing part 15 is fastened to the stator 3 of the electric motor 1, while the outer bearing part 17 is fastened to the rotor 5 of the electric motor 1. The inner bearing part 15 comprises a shaft 19 which is fixedly arranged relative to the stator 3 and which has a centerline 21 which coincides with the axis of rotation 7. The shaft 19 is provided with a smooth circular-cylindrical bearing surface 23 which is concentric with the centerline 21. The inner bearing part 15 further comprises an annular bearing plate 25 provided with annular bearing surfaces 27 and 29 extending perpendicular to the centerline 21. The outer bearing part 17 comprises a bearing bush 31 fastened to the rotor 5 and having a centerline 33 which during operation coincides substantially with the centerline 21 of the shaft 19. The bearing bush 31 has a circular-cylindrical bearing surface 35 which is provided on an inside concentrically with the centerline 33 and which is to cooperate with the bearing surface 23 of the shaft 19. The outer bearing part 17 further comprises an annular bearing chamber 37 in which the bearing plate 25 of the inner bearing part 15 is present. The bearing chamber 37 is closed by means of an annular closing plate 39 of the outer bearing part 17. The bearing chamber 37 is provided with a smooth, annular bearing surface 41 which extends perpendicular to the centerline 33 and which is to cooperate with the annular bearing surface 29 of the bearing plate 25, while the closing plate 39 is provided with a smooth annular bearing surface 43 which extends perpendicular to the centerline 33 and which is to cooperate with the annular bearing surface 27 of the bearing plate 25. A bearing gap 45 is present between the cooperating bearing surfaces 23 and 35, a bearing gap 47 between the cooperating bearing surfaces 29 and 41, and a bearing gap 49 between the cooperating bearing surfaces 27 and 43, a liquid lubricant being present in said bearing gaps 45, 47 and 49 during operation such as, for example, a lubrication oil or grease.

As FIG. 1a further shows, a first pattern of grooves 51 and a second pattern of grooves 53 are provided in the bearing surface 35 of the bearing bush 31 at an axial distance from one another, each pattern comprising a number of consecutive pairs of grooves 55a, 55b arranged in a V-shape and with regular interspacings. The patterns of grooves 51 and 53 in combination with the smooth bearing surface 23 of the shaft 19 form a radial dynamic groove bearing 57, in which a stabilizing pressure build-up takes place of the liquid lubricant present in the grooves 55a, 55b under the influence of a pumping action of the grooves 55a, 55b during rotation of the bearing bush 31 about the shaft 19, so that the outer bearing part 17 is supported perpendicularly to the axis of rotation 7 relative to the inner bearing part 15. The annular bearing surfaces 27 and 29 of the bearing plate 25 are also provided with respective groove patterns 59 and 61. The groove patterns 59 and 61, visible in side elevation only in FIG. 1a, again each comprise a number of consecutive pairs of grooves 63 arranged in a V-shape with regular interspacings. The patterns of grooves 59 and 61 in combination with the smooth bearing surface 43 and the smooth bearing surface 41, respectively, of the outer bearing part 17 form an axial dynamic groove bearing 65 in which a stabilizing pressure build-up takes place of the liquid lubricant present in the grooves 63 under the influence of a pumping action of the grooves 63 during rotation of the outer bearing part 17 about the inner bearing part 15, so that the outer bearing part 17 is supported parallel to the axis of rotation 7 relative to the inner bearing part 15.

As FIG. 1a further shows, the dynamic groove bearing 9 of the electric motor 1 comprises means 67 for preventing a leakage of liquid lubricant from the dynamic groove bearing 9. Said means 67 are shown in detail in FIG. 1b and comprise an annular barrier 69 which is raised relative to the bearing surface 35 of the outer bearing part 17 and which bounds the bearing gap 45. As FIG. 1b further shows, the bearing surface 23 of the inner bearing part 15 is bounded by a reduced portion 71 of the shaft 19. The annular barrier 69 has an internal diameter $D_R$ which is smaller than a diameter $D_I$ of the bearing surface 23 of the inner bearing part 15 adjacent the annular barrier 69. Furthermore, the annular barrier 69 has a lateral surface 73 facing the bearing gap 45 which is oblique relative to the bearing surface 35 of the outer bearing part 17, the lateral surface 73 enclosing an obtuse angle $\beta$ with the bearing surface 35, as FIG. 1b shows.

The operation of the means 67 for preventing leakage of liquid lubricant from the dynamic groove bearing 9 is as follows. As is usual and known in dynamic groove bearings, a leakage of the liquid lubricant present in the bearing gap 45 between the cooperating bearing surfaces 23 and 35 will occur during operation above a critical speed of the dynamic groove bearing 9. Said speed is determined by inter alia a height of the bearing gap 45 and a viscosity and surface tension of the liquid lubricant. The liquid lubricant leaking from the bearing gap 45 between the cooperating bearing surfaces 23 and 35 during operation is carded along in rotation by the outer bearing part 17 under the influence of frictional forces between the liquid lubricant and the bearing surface 35 of the outer bearing part 17. The liquid lubricant as a result is also subject to a centrifugal force. The centrifugal force acting on the liquid lubricant causes the bearing surface 35 of the outer bearing part 17 to be covered with a layer of liquid lubricant 75 of substantially homogeneous thickness t adjacent the annular barrier 69, which thickness t depends on a quantity of liquid lubricant which is present in the bearing gap 45. As FIG. 1b shows, the layer of liquid lubricant 75 lies against the oblique lateral surface 73 of the annular barrier 69 in the form of a meniscus 77. As FIG. 1b shows, the meniscus 77 has a level h above the bearing surface 35 of the outer bearing part 17. The level h depends on the quantity of liquid lubricant in the bearing gap 45, a composition of the liquid lubricant, a composition of a material from which the outer bearing part 17 and the annular barrier 69 are manufactured or a composition of a coating with which the annular barrier 69 is coated, a speed of the electric motor 1, and the obtuse angle $\beta$ between the lateral surface 73 and the bearing surface 35. The level h increases with an increasing quantity of liquid lubricant in the bearing gap 45. As FIG. 1b shows, the meniscus 77 lies against the lateral surface 73 of the annular barrier 69 at a so-called contact angle $\alpha$. The contact angle $\alpha$ has a value which depends on said composition of the liquid lubricant, said composition of the material from which the outer bearing part 17 and the annular barrier 69 are manufactured or said composition of the coating with which the annular barrier 69 is coated, and the speed of the electric motor 1. The contact angle $\alpha$ becomes smaller with an increasing speed of the electric motor 1, which causes the level h of the meniscus 77 above the bearing surface 35 to rise. Since the contact angle $\alpha$ at a given speed is a function of the composition of the liquid lubricant and the composition of the material from which the outer bearing part 17 and the annular barrier 69 are manufactured or the composition of the coating with which the annular barrier 69 is coated, the level h of the meniscus 77 also depends on the obtuse angle/5 between the lateral surface 73 and the bearing surface 35. To maintain a certain contact angle the level h of the meniscus 77 will rise when said angle $\beta$ becomes smaller, i.e. when the lateral surface 73 becomes steeper. By giving the annular barrier 69 a suitable level above the bearing surface 35 of the outer bearing part 17 it is achieved that the meniscus 77 does not overflow the annular barrier 69, given a previously defined quantity of liquid lubricant in the bearing gap 45, a previously defined composition of the liquid lubricant and of the material from which the outer bearing part 17 and the annular barrier 69 are manufactured, a previously defined angle $\beta$ between the lateral surface 73 and the bearing surface 35, and a previously defined maximum speed of the electric motor 1. Leakage of the liquid lubricant from the dynamic groove bearing 9 during operation is prevented in this way, leakage also being prevented at comparatively high speeds of the electric motor 1 through a favourable design of the height of the annular barrier 69 above the bearing surface 35. Since the internal diameter $D_R$ of the annular barrier 69 in the first embodiment of the dynamic groove bearing 9 according to the invention is smaller than the diameter $D_I$ of the bearing surface 23 of the internal bearing part 15, a comparatively great level h of the meniscus 77 is admissible, so that, for example, a comparatively large quantity of liquid lubricant which fills up the bearing gap 45 substantially entirely up to the annular barrier 69 is admissible without leakage. A good distribution of the liquid lubricant over the dynamic groove bearing 9 and a satisfactory operation of the dynamic groove bearing 9 are obtained thereby.

It is noted that the use of said internal diameter $D_R$ of the annular barrier 69 renders a mechanical division necessary, for example in the shaft 19, to facilitate mounting of the bearing bush 31 around the shaft 19. Such a division is shown in FIG. 1a with reference numeral 79.

As was noted above, the level h of the meniscus 77 above the bearing surface 35 increases as the angle $\beta$ between the bearing surface 35 and the lateral surface 73 of the annular barrier 69 decreases. The use of the oblique lateral surface 73 reduces the required height of the annular barrier 69 above the bearing surface 35, the required height of the barrier 69, given a certain maximum speed of the electric motor 1, decreasing with an increase in the angle β. When the angle β increases, however, an axial length of the oblique lateral surface 73 of the barrier 69 indicated with $L_R$ in FIG. 1b increases. A maximum admissible value for the angle β is accordingly also determined by a constructionally maximum admissible value for the axial length $L_R$.

In the electric motor 81 shown in FIG. 2a, the rotor 5 is journaled with a rotation possibility relative to the stator 3 about the axis of rotation 7 by means of a second embodiment of a dynamic groove bearing 83 according to the invention. The dynamic groove bearing 83 comprises means 85 for preventing leakage of liquid lubricant from the dynamic groove bearing 83, which means are different from the means 67 of the first embodiment of the dynamic groove bearing 9 described above. Said means 85 are shown in detail in FIG. 2b and comprise, as do the means 67 described above, an annular barrier 87 which is raised above the bearing surface 35 of the outer bearing part 17 and which bounds the bearing gap 45. In contrast to the dynamic groove bearing 9, the inner bearing part 15 of the dynamic groove bearing 83 comprises a shaft 89 of constant diameter $D_I$, so that the bearing surface 23 of the shaft 89 has a diameter D adjacent the annular barrier 87 which is equal to a diameter $D_I$ of the shaft 89 outside the bearing gap 45. As FIG. 2b shows, the annular barrier 87 of the dynamic groove bearing 83 has an internal diameter $D_R$ which is greater than the diameter $D_I$ of the bearing surface 23 of the inner bearing part 15 adjacent the annular barrier 87, and smaller than a diameter $D_o$ of the bearing surface 35 of the outer bearing part 17 adjacent the annular barrier 87. Furthermore, the annular barrier 87, like the annular barrier 69 of the dynamic groove bearing 9, has a lateral surface 91 which faces the bearing gap 45 and which is oblique relative to the bearing surface 35 of the outer bearing part 17, while enclosing an obtuse angle β with the bearing surface 35. The operation of the means 85 of the dynamic groove bearing 83 corresponds to the operation of the means 67 of the dynamic groove bearing 9. The use of a sufficient quantity of liquid lubricant in the bearing gap 45 of the dynamic groove bearing 83, filling the bearing gap 45 only partly adjacent the annular barrier 87, in conjunction with a suitable value of the angle β achieves that the meniscus 77 of the liquid lubricant 75 will not pass over the annular barrier 87 during operation at a predetermined maximum speed of the electric motor 81. Leakage of liquid lubricant from the dynamic groove bearing 83 is thus prevented by the annular barrier 87 whose internal diameter $D_R$ is greater than the diameter $D_I$ of the bearing surface 23 of the inner bearing part 15 adjacent the barrier 87. Since the barrier 87 is given said internal diameter $D_R$, the shaft 89 of the inner bearing part 15 need not be given a reduced portion, so that the construction, manufacture, and assembly of the dynamic groove bearing 83 are simplified.

In the electric motor 93 shown in FIG. 3a, the rotor 5 is journaled with rotation possibility about the axis of rotation 7 relative to the stator 3 by means of a third embodiment of a dynamic groove bearing 95 according to the invention. The dynamic groove bearing 95 comprises means 97 for preventing leakage of liquid lubricant from the dynamic groove bearing 95 which are different from the means 67 described above of the first embodiment of the dynamic groove bearing 9 and from the means 85 of the second embodiment of the dynamic groove bearing 83. Said means 97 are shown in detail in FIG. 3b and comprise an annular barrier 99 which is raised with respect to the bearing surface 35 of the outer bearing part 17 and which corresponds to the annular barrier 69 of the dynamic groove bearing 9, i.e. has an internal diameter $D_R$ which is smaller than a diameter $D_I$ of the bearing surface 23 of the inner bearing part 15 adjacent the annular barrier 99. The annular barrier 99 further comprises, as does the annular barrier 69 of the dynamic groove bearing 9, a lateral surface 101 which faces the bearing gap 45, which is oblique relative to the bearing surface 35 of the outer bearing part 17, and which encloses an obtuse angle β with the bearing surface 35.

As FIGS. 3a and 3b further show, the inner bearing part 15 has a shaft 103 which is provided with a conical surface 105 positioned opposite the lateral surface 101 of the annular barrier 99. As FIG. 3b shows, the conical surface 105 encloses an obtuse angle γ with the bearing surface 23 of the inner bearing part 15, which angle γ is smaller than the angle β, so that an annular chamber 107 is present between the lateral surface 101 of the annular barrier 99 and the conical surface 105 of the inner bearing part 15, which chamber widens out in a direction away from the bearing gap 45. As FIG. 3b further shows, the conical surface 105 extends in axial direction away from the bearing gap 45 to beyond the lateral surface 101 of the annular barrier 99.

When the electric motor 93 rotates, the operation of the annular barrier 99 for preventing leakage of liquid lubricant from the dynamic groove bearing 95 corresponds to the operation of the annular barrier 69 of the dynamic groove bearing 9. The annular barrier 99 accordingly prevents leakage of liquid lubricant from the dynamic groove bearing 95 also at comparatively high speeds of the electric motor 93, such that a quantity of liquid lubricant can be used in the bearing gap 45 which fills the bearing gap 45 substantially entirely up to the annular barrier 99. FIG. 3b shows the liquid lubricant 109 when the electric motor 93 is stationary, when part of the liquid lubricant 109 flows from the bearing gap 45 under the influence of capillary forces. As FIG. 3b shows, the liquid lubricant 109 which has flown from the bearing gap 45 in the stationary condition forms a meniscus 111 in the annular chamber 107 between the lateral surface 101 of the annular barrier 99 and the conical surface 105 of the inner bearing part 15. As a result of the divergence of the annular chamber 107 as seen from the bearing gap 45, the liquid lubricant 109 in the annular chamber 107 is subject to a capillary force directed towards the bearing gap 45. Said capillary force keeps the liquid lubricant 109 in the annular chamber 107 while the electric motor 93 is stationary, so that leakage of liquid lubricant from the dynamic groove bearing 95 is prevented also while the electric motor 93 is not running. The fact that the conical surface 105 extends from the bearing gap 45 in axial direction to beyond the lateral surface 101 of the annular barrier 99 means that the annular chamber 107 has a volume which is as large as possible, so that a comparatively large quantity of liquid lubricant can be retained in the annular chamber 107 under the influence of the capillary force when the electric motor 93 is stationary.

FIGS. 4 and 5 diagrammatically show a data storage unit 113 provided with an electric motor 1, 81, 93 comprising a dynamic groove bearing 9, 83, 95 according to the invention. The data storage unit 113 comprises a number of parallel information discs 115 which can be rotated about the axis of rotation 7 of the electric motor 1, 81, 93 in a housing 117 by means of said electric motor 1, 81, 98. The information discs 115 are, for example, so-called hard disks for use in a computer. As FIG. 5 shows, the information discs 115 are for this purpose fastened at regular axial interspacings to the rotor 5 of the electric motor 1, 81, 93, while the stator 3 of the electric motor 1, 81, 93 is fastened to a bottom plate 119 of the housing 117. The data storage unit 113 is further provided with a scanning unit 121 with a number of magnetic heads 123 for cooperation with the information discs 115. The magnetic heads 123 are fastened to an arm 125 which is pivotable relative to the housing 117 and the information discs 115 and which has an individual magnetic head 123 for each information disc 115. It is noted that only one of the magnetic heads 123 is visible in FIG. 4, while the arm 125 and the magnetic heads 123 are not shown in FIG. 5 for simplicity's sake. When the rotor 5 with the information discs 115 is rotated about the axis of rotation 7 by means of the electric motor 1, 81, 93, and the magnetic heads 123 are positioned relative to the rotating information discs 115 by means of the arm 125, the information discs 115 are read or written by the magnetic heads 123.

The electric motor 1, 81, 93 should rotate at a comparatively high speed in order to limit a time required for reading or writing the information discs 115. The electric motor 1, 81, 93 with the dynamic groove bearing 9, 83, 95 used therein is particularly suitable for use in the data storage unit 113 because leakage of liquid lubricant at such high speeds is prevented in the dynamic groove bearing 9, 83, 95 used in the electric motor 1, 81, 93. It is indeed prevented in this manner that the information discs 115 and the magnetic heads 123 are polluted by leakage of liquid lubricant. Such pollution of the information discs 115 and the magnetic heads 123 usually causes a disturbance in the operation of the data storage unit 113 and the computer used in combination with it. The leakproof dynamic groove bearings 9, 83, 95 in addition provide for a comparatively long, trouble-free operation of the electric motor 1, 81, 93.

The dynamic groove bearings 9, 83, 95 described above each comprise a radial dynamic groove bearing 57 with cooperating circular-cylindrical bearing surfaces 23, 35, and an axial dynamic groove bearing 65 with cooperating annular bearing surfaces 27, 43 and 29, 41. It is noted that the invention is also applicable to dynamic groove bearings in which the cooperating bearing surfaces are of a different shape such as, for example, dynamic groove bearings with conical or spherical bearing surfaces which have a radial as well as an axial bearing function.

It is noted that, as described above, the internal diameter $D_R$ of the annular barrier 69, 87, 99 is defined in relation to the diameter $D_I$ of the bearing surface 23 of the inner bearing part 15 adjacent the annular barrier 69, 87, 99, and in relation to the diameter $D_o$ of the bearing surface 35 of the outer bearing part 17 adjacent the annular barrier 87. Said diameters $D_I$ and $D_o$ in the dynamic groove bearings 9, 83, 95 described above correspond to a diameter of the bearing surface 23 of the inner bearing part 15 adjacent the pattern of grooves 51, 53 and to a diameter of the bearing surface 35 of the outer bearing part 17 adjacent the pattern of grooves 51, 53, respectively. According to the invention, the bearing surfaces of the inner bearing part and the outer bearing part may alternatively have diameters adjacent the annular barrier which are different from the diameters of said bearing surfaces adjacent the pattern of grooves. Thus, for example, the shaft 19 of the inner bearing part 15 of the dynamic groove bearing 9 shown in FIG. 1a may be given a diameter above the bearing plate 25 which is, for example, greater than the diameter $D_I$, in which case the closing plate 39 is provided with an annular barrier for preventing leakage of liquid lubricant along the closing plate 39.

It is further noted that the obtuse angle β enclosed by the lateral surface 73, 91, 101 of the annular barrier 69, 87, 99 and the bearing surface 35 of the outer bearing part 17 may alternatively be approximately 90°, in which case the lateral surface 73, 91, 101 is substantially perpendicular to the bearing surface 35. The barrier 69, 87, 99 may thus be provided in a comparatively simple manner, but the meniscus 77 of the liquid lubricant 75 will now have a comparatively high level h above the bearing surface 35.

It is further noted that the dynamic groove bearing 9, 83, 95 may be used in devices other than a data storage unit 113 as described above, for example, in an electric motor of a rotatable scanning unit in a magnetic tape appliance. Furthermore, the dynamic groove bearing 9, 83, 95 may be used in a different type of motor instead of in an electric motor, for example, in a pneumatic motor.

It is finally noted that the invention is also applicable to an electric motor for a data storage unit which comprises only one rotatable information disc. The dynamic groove bearing according to the invention is eminently suitable for miniaturization, so that such a data storage unit and the information disc used therein may have comparatively small dimensions.

We claim:

1. A dynamic groove bearing with an inner bearing part and an outer bearing part which is rotatable about the inner bearing part, which bearing parts are provided with cooperating bearing surfaces between which there is a bearing gap in which a liquid lubricant is present during operation, wherein the bearing surface of at least one of the bearing parts is provided with a pattern of grooves and the dynamic groove bearing comprises means for preventing leakage of liquid lubricant from the bearing gap, characterized in that said means for preventing leakage comprise an annular barrier which is raised relative to the bearing surface of the outer bearing part and which bounds the bearing gap, and the annular barrier has a lateral surface facing the bearing gap which is oblique relative to the bearing surface of the outer bearing part.

2. A dynamic groove bearing as claimed in claim 1, characterized in that the annular barrier has an internal diameter which is smaller than a diameter of the bearing surface of the inner bearing part adjacent the annular barrier.

3. A dynamic groove bearing as claimed in claim 1, characterized in that the annular barrier has an internal diameter which is greater than a diameter of the bearing surface of the inner bearing part adjacent the annular barrier and smaller than a diameter of the bearing surface of the outer bearing part adjacent the annular barrier.

4. A dynamic groove bearing as claimed in claim 1, characterized in that the inner bearing part has a conical surface positioned opposite the lateral surface of the annular barrier, an annular chamber being present between the lateral surface of the annular barrier and the conical surface, which chamber widens in a direction away from the bearing gap.

5. A dynamic groove bearing as claimed in claim 4, characterized in that the conical surface extends in a direction away from the bearing gap to beyond the lateral surface of the annular barrier.

6. An electric motor with a stator and a rotor which is journaled with rotation possibility relative to the stator by means of a dynamic groove bearing, the stator being fastened to an inner bearing part of the dynamic groove bearing and the rotor being fastened to an outer bearing part of the dynamic groove bearing, which bearing parts are provided with cooperating bearing surfaces between which there is a bearing gap in which a liquid lubricant is present during operation, wherein the bearing surface of at least one of the bearing parts is provided with a pattern of grooves and the dynamic groove bearing comprises means for preventing leakage of liquid lubricant from the bearing gap, characterized in that said means for preventing leakage comprise an annular barrier which is raised relative to the bearing surface of the outer bearing part and which bounds the bearing gap, and the annular barrier has a lateral surface facing the bearing gap which is oblique relative to the bearing surface of the outer bearing part.

7. An electric motor as claimed in claim 6, characterized in that the annular barrier has an internal diameter which is smaller than a diameter of the bearing surface of the inner bearing part adjacent the annular barrier.

8. An electric motor as claimed in claim 6, characterized in that the annular barrier has an internal diameter which is greater than a diameter of the bearing surface of the inner bearing part adjacent the annular barrier and smaller than a diameter of the bearing surface of the outer bearing part adjacent the annular barrier.

9. An electric motor as claimed in claim 6, characterized in that the inner bearing part has a conical surface positioned opposite the lateral surface of the annular barrier, an annular chamber being present between the lateral surface of the annular barrier and the conical surface, which chamber widens in a direction away from the bearing gap.

10. An electric motor as claimed in claim 9, characterized in that the conical surface extends in a direction away from the bearing gap to beyond the lateral surface of the annular barrier.

11. A data storage unit with an information disc and a scanning unit for cooperating with the information disc, said disc being rotatable in a housing by means of an electric motor, said motor comprising a stator and a rotor which is journaled with rotation possibility relative to the stator by means of a dynamic groove bearing, the stator being fastened to an inner bearing part of the dynamic groove bearing and the rotor being fastened to an outer bearing part of the dynamic groove bearing, which bearing parts are provided with cooperating bearing surfaces between which there is a bearing gap in which a liquid lubricant is present during operation, wherein the bearing surface of at least one of the bearing parts is provided with a pattern of grooves and the dynamic groove bearing comprises means for preventing leakage of liquid lubricant from the bearing gap, characterized in that said means for preventing leakage comprise an annular barrier which is raised relative to the bearing surface of the outer bearing part and which bounds the bearing gap, and the annular barrier has a lateral surface facing the bearing gap which is oblique relative to the bearing surface of the outer bearing part.

12. A data storage unit as claimed in claim 11, characterized in that the annular barrier has an internal diameter which is smaller than a diameter of the bearing surface of the inner bearing part adjacent the annular barrier.

13. A data storage unit as claimed in claim 11, characterized in that the annular barrier has an internal diameter which is greater than a diameter of the bearing surface of the inner bearing part adjacent the annular barrier and smaller than a diameter of the bearing surface of the outer bearing part adjacent the annular barrier.

14. A data storage unit as claimed in claim 11, characterized in that the inner bearing part has a conical surface positioned opposite the lateral surface of the annular barrier, an annular chamber being present between the lateral surface of the annular barrier and the conical surface, which chamber widens in a direction away from the bearing gap.

15. A data storage unit as claimed in claim 14, characterized in that the conical surface extends in a direction away from the bearing gap to beyond the lateral surface of the annular barrier.

* * * * *